United States Patent
Watanabe et al.

(10) Patent No.: US 10,851,687 B2
(45) Date of Patent: Dec. 1, 2020

(54) RELIEF VALVE DEVICE

(71) Applicant: YAMADA MANUFACTURING CO., LTD., Kiryu (JP)

(72) Inventors: Takatoshi Watanabe, Kiryu (JP); Junichi Miyajima, Kiryu (JP); Atsushi Kaneko, Kiryu (JP); Yuya Kato, Kiryu (JP)

(73) Assignee: YAMADA MANUFACTURING CO., LTD., Kiryu (JP)

(*) Notice: Subject to any disclaimer, the term of this patent is extended or adjusted under 35 U.S.C. 154(b) by 65 days.

(21) Appl. No.: 16/243,336

(22) Filed: Jan. 9, 2019

(65) Prior Publication Data
US 2019/0145293 A1 May 16, 2019

Related U.S. Application Data

(62) Division of application No. 15/224,528, filed on Jul. 30, 2016, now Pat. No. 10,247,066.

(30) Foreign Application Priority Data

Aug. 11, 2015 (JP) ................... 2015-158909
Jun. 17, 2016 (JP) ................... 2016-121273

(51) Int. Cl.
*F01M 1/16* (2006.01)
*F01M 1/02* (2006.01)
(Continued)

(52) U.S. Cl.
CPC ............... *F01M 1/16* (2013.01); *F01M 1/02* (2013.01); *F16K 17/0473* (2013.01); *F16K 17/065* (2013.01)

(58) Field of Classification Search
CPC .... F01M 1/02; F01M 1/16; F01M 2001/0253; F16K 17/06; F16K 17/065
See application file for complete search history.

(56) References Cited

U.S. PATENT DOCUMENTS 7,114,482 B2 * 10/2006 Lane ................... F01M 1/02
                                                          123/196 R
8,210,317 B2 ‡ 7/2012 Aamand .............. F01M 1/08
                                                          184/6.8
(Continued)

FOREIGN PATENT DOCUMENTS

JP      06-193753 A        7/1994
JP      H 06-193753 A  ‡   7/1994
JP      2010-238205 A      10/2010

OTHER PUBLICATIONS

Machine translation JP 2010-238205.‡
(Continued)

*Primary Examiner* — Kevin F Murphy
(74) *Attorney, Agent, or Firm* — McGinn I.P. Law Group, PLLC.

(57) ABSTRACT

A relieve valve device includes a housing including a valve chamber, an orifice, and a relief discharge port, a valve body that opens and closes the relief discharge port while moving inside the valve chamber of the housing, a relief valve including an elastic member that elastically biases the valve body in a direction in which the valve body closes the relief discharge port, and an oil control valve that controls a supply of oil into the valve chamber. An inlet port for the oil supplied from the oil control valve and the orifice are configured such that the oil can always circulate in the valve chamber. The valve chamber includes a first valve passage portion including the orifice, and a second valve passage portion. The valve body includes a first valve portion and a second valve portion arranged in an axial direction.

20 Claims, 11 Drawing Sheets

(51) Int. Cl.
*F16K 17/04* (2006.01)
*F16K 17/06* (2006.01)

(56) References Cited

U.S. PATENT DOCUMENTS 8,926,299 B2 ‡ 1/2015 Watanabe ............. F04C 14/185
    418/21
9,291,283 B2 ‡ 3/2016 Miyachi ................ F01L 1/3442

OTHER PUBLICATIONS

United States Notice of Allowance dated Nov. 15, 2018, in U.S. Appl. No. 15/224,528.
United States Office Action dated Jul. 6, 2018, in U.S. Appl. No. 15/224,528.
Japanese Office Action, dated Dec. 30, 2018, in Japanese Application No. 2016-121273.

* cited by examiner
‡ imported from a related application

LOW ROTATION SPEED RANGE

OIL CONTROL VALVE IS FULLY CLOSED

MEDIUM ROTATION SPEED RANGE

OIL CONTROL VALVE IS OPEN

HIGH ROTATION SPEED RANGE

OIL CONTROL VALVE IS APPROXIMATELY FULLY CLOSED

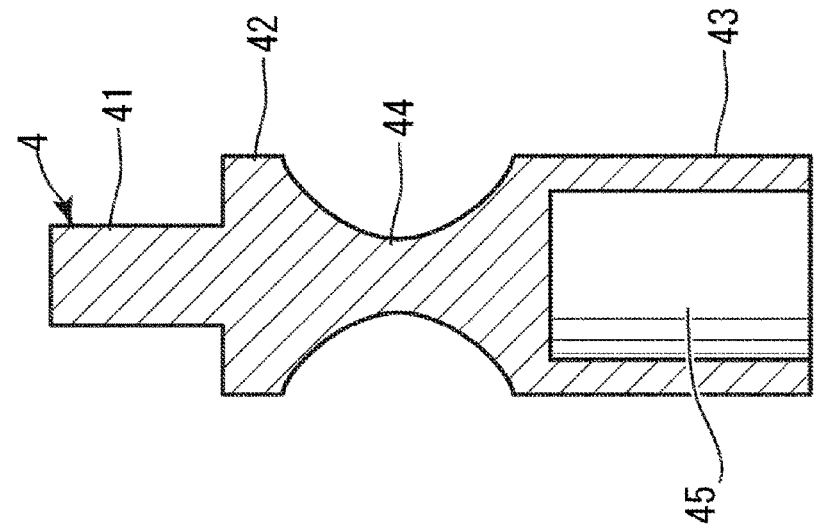
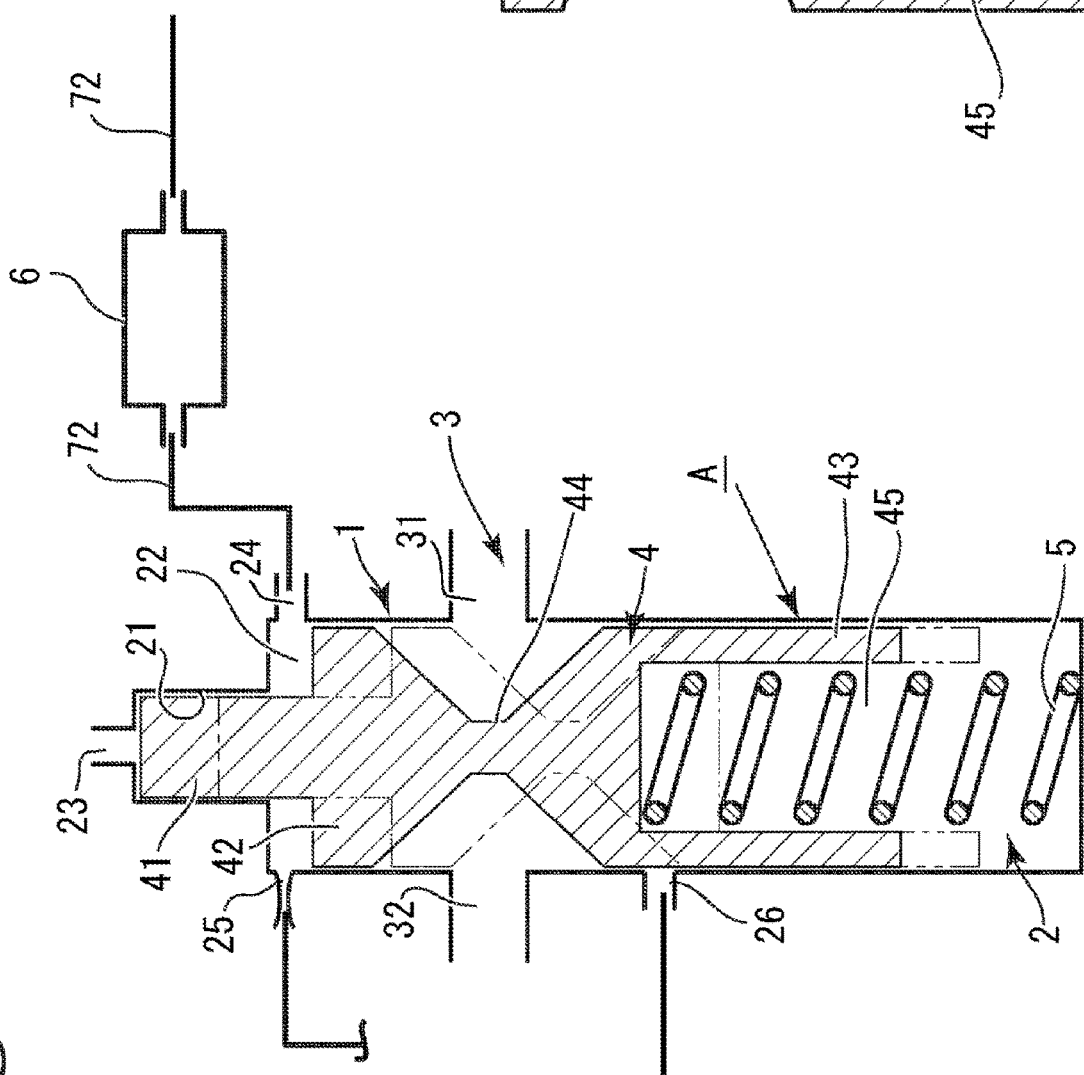

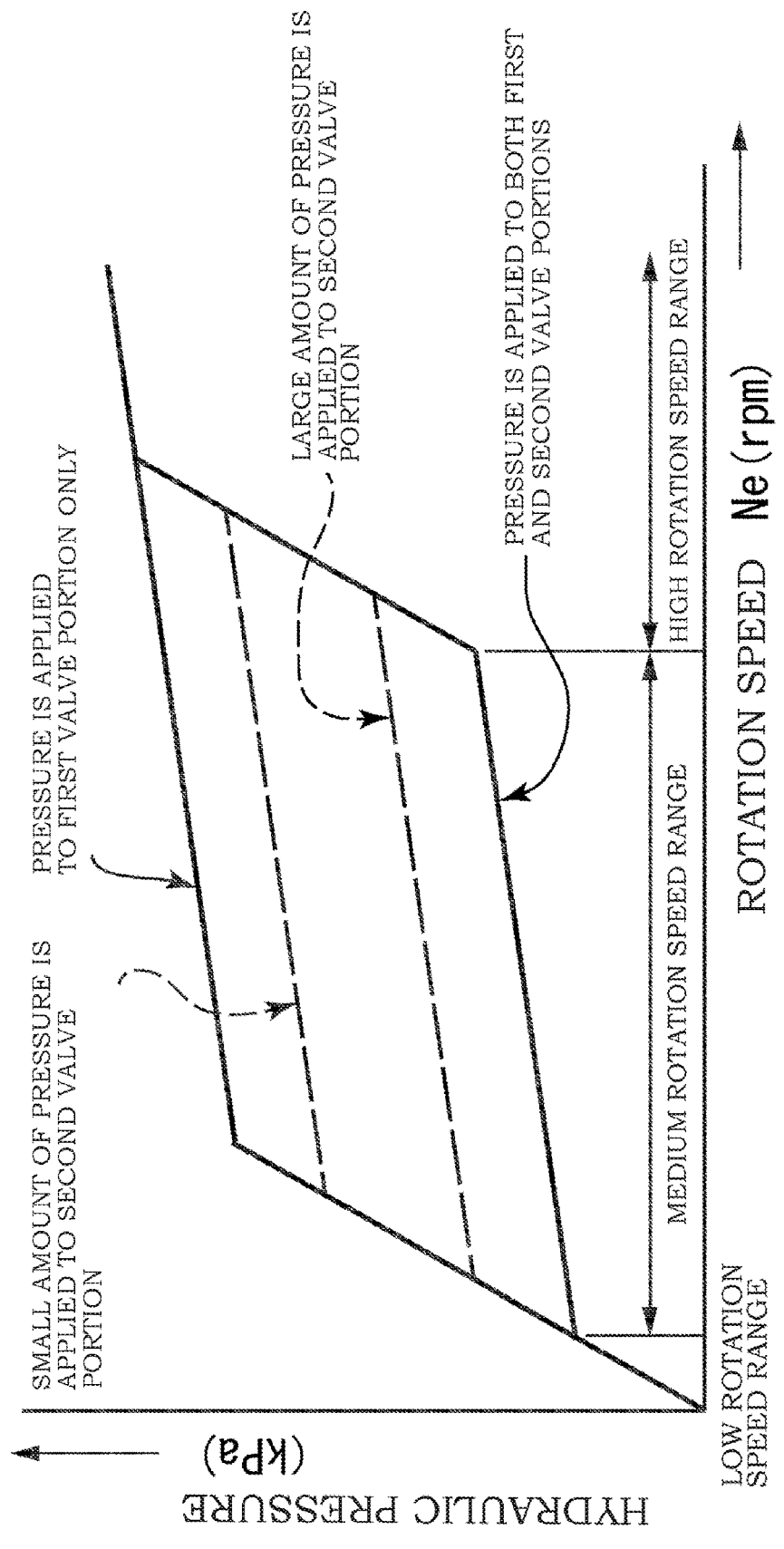

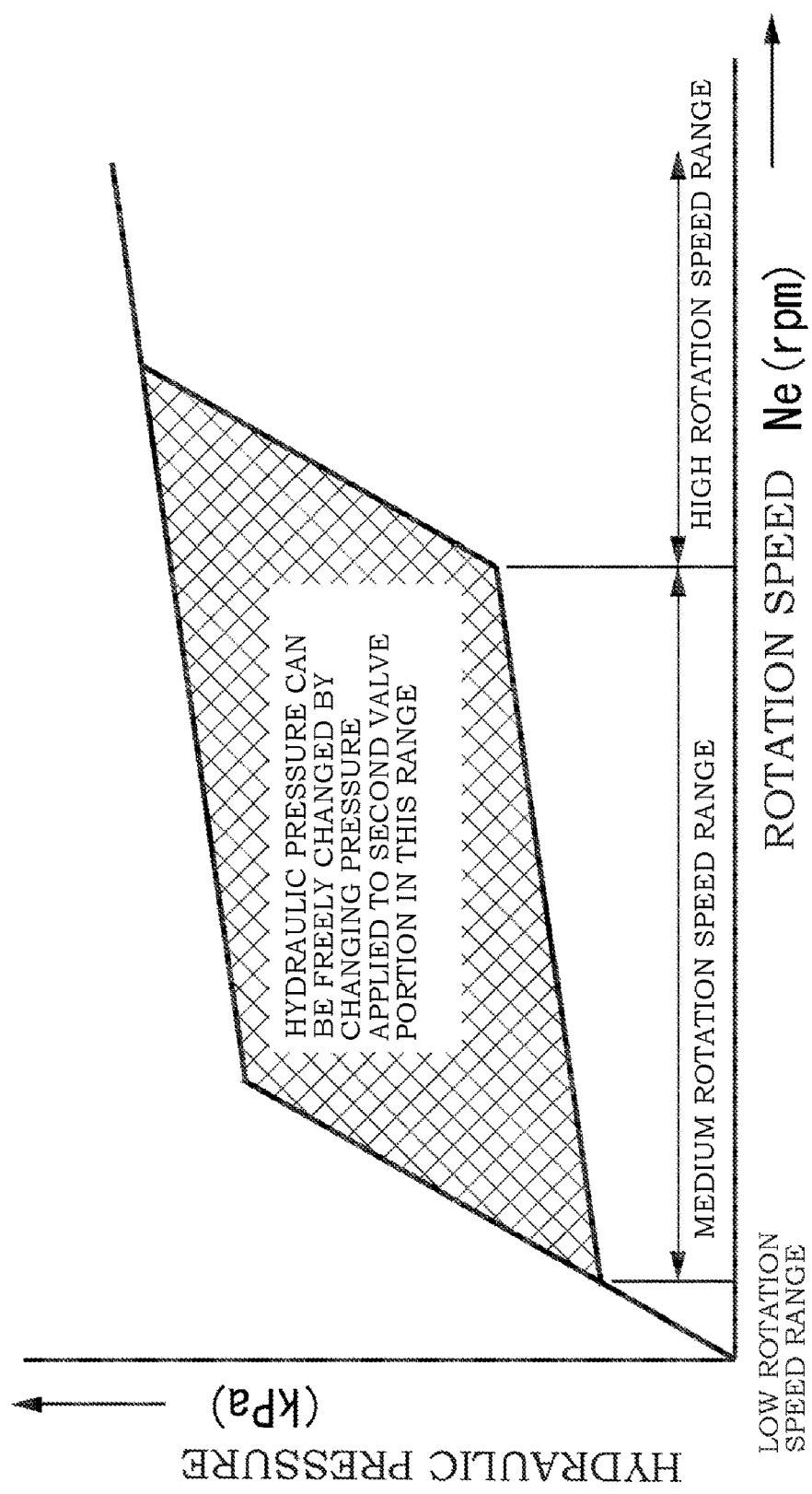

US 10,851,687 B2

RELIEF VALVE DEVICE

The present application is a Divisional Application of U.S. patent application Ser. No. 15/224,528, filed on Jul. 30, 2016, which is based on and claims priority from Japanese Patent Application No. 2015-158909, filed on Aug. 11, 2015, and Japanese Patent Application No. 2016-121273, filed on Jun. 17, 2016, the entire contents of which are incorporated herein by reference.

FIELD OF THE INVENTION

The present invention relates to a relief valve device capable of allowing an oil pump of a vehicle engine or the like to discharge oil with an appropriate discharge pressure in low, medium, and high rotation speed ranges of the engine.

DESCRIPTION OF THE RELATED ART

Conventionally, there are various types of relief valve devices each provided in an oil circulation circuit that supplies oil to an engine and supplying oil with a hydraulic pressure appropriate for low, medium, and high rotation speed ranges of the engine Japanese Patent Application Publication. No. 2010-238205 discloses an example of a relief valve device of this type.

The invention disclosed in Japanese Patent Application Publication No. 2010-238205 will be described briefly. In the following description the reference numerals used in Japanese Patent Application Publication No. 2010-238205 are used as they are by putting the same in brackets. In a valve body (27) which is a relief valve, an orifice-shaped return passage (26E) is formed downstream a back pressure chamber (35) which is hydraulic pressure control chamber. In a state in which oil is relieved (exhausted) with low hydraulic pressure (see FIGS. 4A and 4B in Japanese Patent Application Publication No. 2010-238205), the oil returns from the back pressure chamber (35) to an intake side of a pump through a return passage (26E) formed in a sleeve (26).

In a state in which oil is relieved (exhausted) with high hydraulic pressure (see FIGS. 5A and 5B in Japanese Patent Application Publication No. 2010-238205), oil cannot move from the back pressure chamber (35) to the return passage (26E) formed in the sleeve (26) and the oil in the back pressure chamber (35) cannot return to the intake side of the pump.

SUMMARY OF THE INVENTION

However, the return passage (26E) has a function of rotating a valve body (27) in a circumferential direction so that bubbles and foreign materials moved toward the back pressure chamber (35) are discharged from the back pressure chamber (35) toward the intake side of the pump, together with oil that continues to flow through the back pressure chamber (35). An increase in the pressure of the back pressure chamber (35) required for switching a valve opening pressure starts before the return passage is open. The return passage (26E) is formed such that an opening area of an exit passage (25) is smaller than an opening area of an inlet/outlet hole (36) of the back pressure chamber (35).

The opening portion of the return passage (26E) acts as a large passage resistance in relation to the exit passage (25) whereby the amount of oil flowing from the back pressure chamber (35) is limited and the hydraulic pressure in the back pressure chamber (35) is maintained approximately constant. A switching valve (40) is a three-way electromagnetic valve, for example. When current is supplied to the switching valve (40), an inlet passage (42) is selected as a passage that communicates with the back pressure chamber (35) through an inlet/outlet passage (41) and the hydraulic pressure in the back pressure chamber (35) increases. Moreover, when the supply of current to the switching valve (40) is blocked, a discharge passage (43) is selected as a passage that communicates with the back pressure chamber (35) through the inlet/outlet passage (41) and the hydraulic pressure in the back pressure chamber (35) decreases.

In the state in which oil is relieved with low hydraulic pressure (see FIGS. 4A and 4B in Japanese Patent Application Publication No. 2010-238205), the return passage (26E) is always open. In the state in which oil is relieved with high hydraulic pressure (see FIGS. 5A and 5B in Japanese Patent Application Publication No. 2010-238205), the return passage (26E) is always closed. In this conventional technique, the relief pressure can be changed between two values only, and it is difficult to realize a relief operation with an intermediate hydraulic pressure between the relief operation with a low hydraulic pressure and the relief operation with a high hydraulic pressure. This is shown in FIG. 8 which is a graph illustrating the characteristics of the conventional technique. Thus, an object of the present invention is to perform a relief operation with an intermediate hydraulic pressure between the relief operation with a low hydraulic pressure and the relief operation with a high hydraulic pressure in an oil pump of a vehicle engine or the like.

As a result of intensive studies to the above problems, the present inventor solved the problems by providing, as a first embodiment, a relief valve device including: a housing including a valve chamber, an orifice, and a relief discharge port; a valve body that opens and closes the relief discharge port while moving inside the valve chamber of the housing; a relief valve including an elastic member that elastically biases the valve body in a direction in which the valve body closes the relief discharge port; and an oil control valve that controls the supply of oil into the valve chamber, wherein an inlet port for the oil supplied from the oil control valve and the orifice are configured such that oil can always circulate in the valve chamber.

A second embodiment of the present invention solves the problems by the relief valve device according to the first embodiment, in which the valve chamber has a first valve passage portion, and a second valve passage portion having the orifice, the valve body has a first valve portion and a second valve portion arranged in an axial direction, the oil control valve supplies oil to the second valve passage portion, the first valve portion is disposed in the first valve passage portion, the second valve portion is disposed in the second valve passage portion, and oil is supplied to the second valve passage portion through the oil control valve while an amount of oil is increased and decreased steplessly, and the supplied oil is discharged from the orifice.

A third embodiment of the present invention solves the problems by the relief valve device according to the first embodiment, in which the valve chamber has a first valve passage portion having the orifice, and a second valve passage portion, the valve body has a first valve portion and a second valve portion arranged in an axial direction, the oil control valve supplies oil to the first valve passage portion, the first valve portion is disposed in the first valve passage portion, the second valve portion is disposed in the second valve passage portion, and oil is supplied to the first valve passage portion through the oil control valve while an amount of oil is increased and decreased steplessly, and the supplied oil is discharged from the orifice.

A fourth embodiment of the present invention solves the problems by the relief valve device according to the first embodiment, in which an oil inlet port that applies pressure to the valve body is formed on a front end side of the valve chamber, an inlet port close to the oil control valve and the orifice are formed on a rear end side of the valve chamber, and the oil control valve is positioned on the rear end side and an upstream side of the valve chamber so as to supply oil while increasing and decreasing an amount of oil steplessly, and to discharge the supplied oil from the orifice.

A fifth embodiment of the present invention solves the problems by the relief valve device according to the first or second embodiment, in which a solenoid valve is used as the oil control valve. A sixth embodiment of the present invention solves the problems by the relief valve device according to the third or fourth embodiment, in which a solenoid valve is used as the oil control valve. A seventh embodiment of the present invention solves the problems by the relief valve device according to the first or second embodiment, in which a smallest cross-sectional area of a passage to the valve chamber in a fully open state of the oil control valve is larger than a smallest cross-sectional area of the orifice. An eighth embodiment of the present invention solves the problems by the relief valve device according to the third or fourth embodiment, in which a smallest cross-sectional area of a passage to the valve chamber in a fully open state of the oil control valve is larger than a smallest cross-sectional area of the orifice.

A ninth embodiment of the present invention solves the problems by the relief valve device according to the first or second embodiment, in which the oil control valve is fully closed in a rotation speed range near a low rotation speed range and an idling rotation speed range of an engine. A tenth embodiment of the present invention solves the problems by the relief valve device according to the third or fourth embodiment, in which the oil control valve is fully closed in a rotation speed range near a low rotation speed range and an idling rotation speed range of an engine. An eleventh embodiment of the present invention solves the problems by the relief valve device according to the first or second embodiment, in which when a rotation speed increases within a medium rotation speed range of an engine, the oil control valve increases the amount of oil supplied to the valve chamber steplessly. A twelfth embodiment of the present invention solves the problems by the relief valve device according to the third or fourth embodiment, in which when a rotation speed increases within a medium rotation speed range of an engine, the oil control valve increases the amount of oil supplied to the valve chamber steplessly. A thirteenth embodiment of the present invention solves the problems by the relief valve device according to the first or second embodiment, in which when a rotation speed increases within a high rotation speed range of an engine, the oil control valve decreases an amount of oil supplied to the valve chamber steplessly. A fourteenth embodiment of the present invention solves the problems by the relief valve device according to the third or fourth embodiment, in which when a rotation speed increases within a high rotation speed range of an engine, the oil control valve decreases an amount of oil supplied to the valve chamber steplessly.

According to the present invention, the relief valve device includes a valve body that opens and closes the relief discharge port while moving inside the valve chamber of the housing; a relief valve including an elastic member that elastically biases the valve body in a direction in which the valve body closes the relief discharge port; and an oil control valve that controls the supply of oil into the valve chamber, wherein an inlet port for the oil supplied from the oil control valve and the orifice are configured such that oil can always circulate in the valve chamber. Due to this, it is possible to discharge oil with an appropriate discharge pressure in low, medium, and high rotation speed ranges of an engine.

BRIEF DESCRIPTION OF THE DRAWINGS

FIG. 5A is a schematic cross-sectional view of a relief valve device having a valve body according to another embodiment of the present invention and FIG. 5B is a longitudinal front view of another embodiment of the valve body;

FIG. 6 is a first graph illustrating the characteristics of the relief valve device according to the present invention;

FIG. 7 is a second graph illustrating the characteristics of the relief valve device according to the present invention;

DESCRIPTION OF THE PREFERRED EMBODIMENTS

Hereinafter, embodiments of the present invention will be described based on the drawings. A configuration of the present invention has a plurality of embodiments and mainly includes a relief valve A and an oil control valve 6. The relief valve A is incorporated into an oil circulation circuit 7. An oil pump 81 and an engine 82 are provided in the oil circulation circuit 7 (see FIG. 1A). Hereinafter, a first embodiment of the present invention will be described.

Figure 1A:
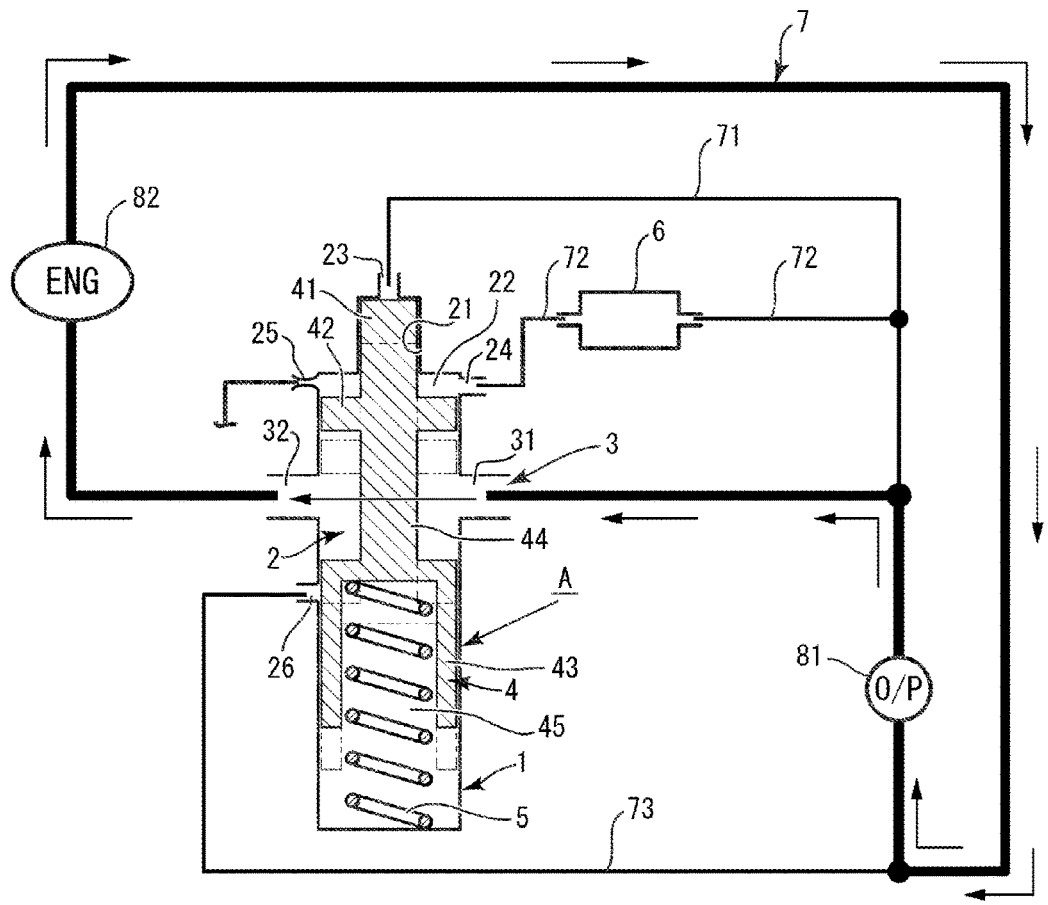
FIG. 1A is a schematic diagram illustrating a state in which a relief valve device according to the present invention is incorporated into an oil circulation circuit.
Figure 1B:
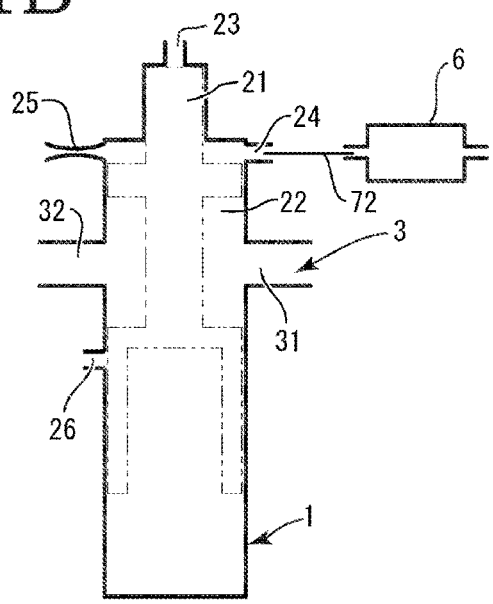
FIG. 1B is a schematic diagram of a housing of a relief valve and an oil control valve.

The relief valve A includes a housing 1, a valve body 4, an elastic member 5, and the like (see FIG. 1A). A valve chamber 2 is formed in the housing 1 (see FIG. 1E). The valve chamber 2 is a chamber serving as a passage through which the valve body 4 moves. Further, a front end and a rear end of the housing 1 are set for the sake of convenience. A valve chamber 2 described later is included in the housing 1 and the front and rear ends of the valve chamber 2 are the same as the front and rear ends of the housing 1. Moreover, it is assumed that even when the direction of the housing 1 (the valve chamber 2) changes, the initially set front and rear ends of the housing 1 (the valve chamber 2) do not change.

Specifically, as illustrated in FIGS. 1A to 1C to FIGS. 5A and 5B and FIGS. 9A and 9B to FIGS. 11A and 11E, the upper side of the housing 1 is defined as the front end and the lower side is defined as the rear end. The valve chamber 2 has a first valve passage portion 21 and a second valve passage portion 22. Alternatively, a side on which the elastic member 5 is disposed is defined as the rear end. Moreover, the first valve passage portion 21 has a smaller inner diameter than the second valve passage portion 22.

A first inlet port 23 is formed in the first valve passage portion 21. The first inlet port 23 communicates through a first branch passage 71 provided on a discharge side (that downstream side) of the oil pump 81 of the oil circulation circuit 7 so as to branch from the oil circulation circuit 7 (see FIG. 1A). A portion of oil discharged from the oil pump 81 flows from the first inlet port 23 to the first valve passage portion 21 through the first branch passage 71.

Moreover, a second inlet port 24 and an orifice 25 are formed in the second valve passage portion 22. The second inlet port 24 communicates with the oil circulation circuit 7 through a second branch passage 72. The second branch passage 72 is provided on the discharge side (the downstream side) of the oil pump 81 of the oil circulation circuit 7 so as to branch from the oil circulation circuit 7 (see FIG. 1A). The orifice 25 is a portion having a role of discharge a very small amount of oil in the second valve passage portion 22 to the outside of the housing 1. Specifically, the orifice 25 is a tubular member having a very small inner diameter and has the shape of a discharge port. The orifice 25 communicates with an oil pan or the like (not illustrated).

Figure 1C:
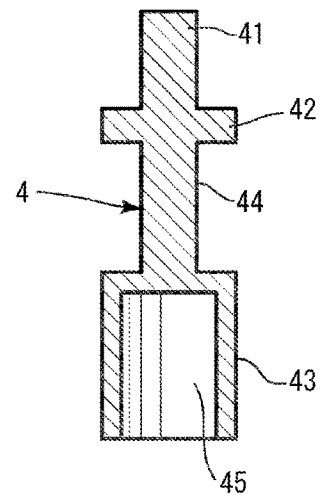
FIG. 1C is a longitudinal schematic side diagram of a valve body.

As illustrated in FIG. 1C, the valve body 4 includes valve portions such as a first valve portion 41, a second valve portion 42, and a third valve portion 43 and a connecting shaft portion 44 that connects these valve portions. The first and second valve portions 41 and 42 are formed continuously in an axial direction and the diameter of the first valve portion. 41 is smaller than the diameter of the second valve portion 42. The second and third valve portions 42 and 43 are connected in a state of being separated by the connecting shaft portion 44 with a predetermined interval interposed therebetween.

The first valve portion 41 slides in the first valve passage portion 21 of the housing 1 and the second valve portion 42 slides in the second valve passage portion 22 of the housing 1 (see FIG. 1A). A hollow cylindrical depression having an opening at a shaft end is formed inside the third valve portion 43 as an elastic member receiving portion 45, and a portion of the elastic member 5 can be inserted in the elastic member receiving portion 45 (see FIGS. 1A and 1C).

As illustrated in FIG. 1A, the valve body 4 is housed in the housing 1 together with the elastic member 5. The valve body 4 housed in the housing 1 is always elastically biased by the elastic member 5 toward the first valve passage portion 21 of the valve chamber 2. Specifically, a coil spring is used as the elastic member 5. As another embodiment, the valve body 4 may have a polyline shape when seen along the axial direction of the connecting shaft portion 44 that connects the opposing surfaces of the second and third valve portions 42 and 43, specifically, may have a double-cone shape such that the diameter of the valve body 4 is the smallest at the center in the axial direction and gradually increases toward the opposite ends (see FIG. 5A).

As still another embodiment, the valve body 4 may have a concave circular arc shape or an approximately C-shape when seen along the axial direction of the connecting shaft portion 44 that connects the opposing surfaces of the second and third valve portions 42 and 43. Specifically, the diameter of the valve body 4 is the smallest at the center in the axial direction of the connecting shaft portion 44 and gradually increases toward the axial ends (see FIG. 5B).

The oil control valve 6 is provided in a second branch passage 72 that connects the second valve passage portion 22 of the valve chamber 2 and the oil circulation circuit 7 (see FIG. 1A). The oil control valve 6 communicates with the second inlet port 24 in relation to the second valve passage portion 22, and the oil having passed through the oil control valve 6 flows from the second inlet port 24 into the second valve passage portion 22. The oil control valve 6 controls the amount of oil on the second branch passage 72. The oil control valve 6 supplies oil to a predetermined portion while changing the amount of oil steplessly. The oil control valve 6 may have various structures. In general, a throttle valve is provided inside the oil control valve 6 and the oil control valve 6 changes the amount of oil by regulating the throttle valve.

A solenoid valve is preferably used as means for controlling the throttle valve of the oil control valve 6. Specifically, a linear solenoid valve is used. In this way, the oil control valve 6 can increase and decrease the amount of oil smoothly and steplessly and increase and decrease the amount of oil to a target value. Moreover, a variable capacitance-type oil pump may be used as means for increasing and decreasing the hydraulic pressure smoothly and steplessly.

In the first embodiment of the present invention, in a state in which the first valve portion 41 positioned at the front end portion of the valve body 4 has reached the first valve passage portion 21 at the front end portion of the valve chamber 2, the second valve portion 42 does not make contact with the front end portion of the second valve passage portion 22, and a gap is formed therebetween. Due to the gap, the orifice 25 and the second inlet port 24 always communicate with each other inside the second valve passage portion 22. Moreover, the oil having passed through the oil control valve 6 can pass from the second inlet port 24 through the second valve passage portion 22 of the valve chamber 2 and flow into the orifice 25 (see FIG. 1A and FIGS. 2A and 2B). That is, the oil flowing from the oil control valve 6 into the valve chamber 2 always flows from the orifice 25. Such a configuration is true to the other embodiments as well as the first embodiment.

Next, a specific embodiment of a configuration in which the relief valve A is incorporated into the oil, circulation circuit 7 will be described. A portion that forms the passage of the oil circulation circuit 7 is formed in the housing 1 of the relief valve A. This portion is referred to as a main passage 3 of the housing 1 (see FIG. 1A). The main passage 3 is disposed at a position such that the main passage 3 does not cross the first valve passage portion 21 and the second valve passage portion 22.

An inlet hole 31 and an outlet hole 32 of the main passage are formed in an inner circumferential wall of the valve chamber 2. The relief discharge port 26 of the housing 1 is disposed at position on the opposite side of the first and second valve passage portions 21 and 22 about the main passage 3 (see FIG. 1A). The relief discharge port 26 communicates, via a relief branch passage 73, with a port on of the oil circulation circuit 7 on the upstream side and the intake side of the oil pump 81 (see FIG. 1A). The connecting shaft portion 44 of the valve body 4 is always positioned in the inlet hole 31 and the outlet hole 32 of the main passage 3 (see FIG. 1A).

Since the diameter of the connecting shaft portion 44 is smaller than the inner diameter of the valve chamber 2 in the main passage 3, the inlet hole 31 and the outlet hole 32 are not closed but always in the open state. Due to this, the oil pump 81 allows oil to always circulate in the oil circulation circuit 7 (see FIGS. 2A and 2B to FIGS. 4A and 4B).

The third valve portion 43 of the valve body has a role of opening and closing the relief discharge port 26 in such a way that the valve body 4 reciprocates in the valve chamber 2 in the axial direction to open and close the relief discharge port 26 and a portion of oil flowing through the main passage 3 of the oil circulation circuit 7 flows into the relief discharge port 26 whereby a relief operation is performed.

Figure 2A:
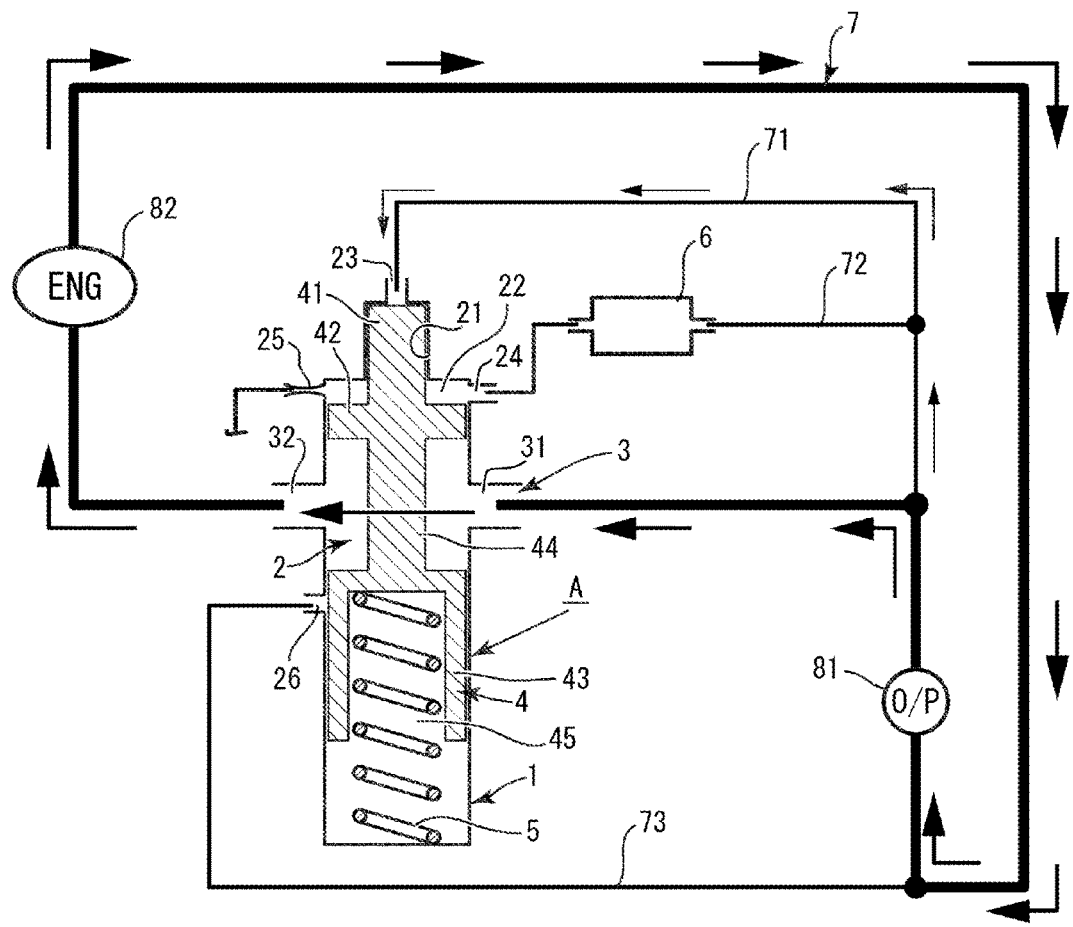
FIG. 2A is a schematic diagram illustrating the flow, in a low rotation speed range, of oil in the relief valve device according to the present invention
Figure 2B:
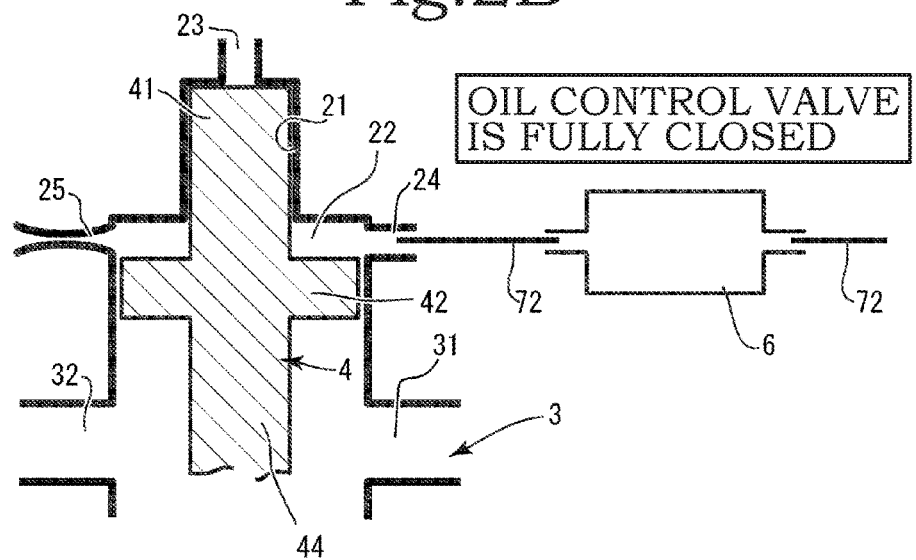
FIG. 2B is an enlarged longitudinal schematic side diagram illustrating a first valve passage portion, a second valve passage portion, and an oil control valve.

Next, a relief operation of the relief valve device according to the present invention in low, medium, and high rotation speed ranges of the engine 82 will be described. First, as illustrated in FIGS. 2A and 2B, the full hydraulic pressure generated by the oil pump 81 is transmitted to the engine 82 in a rotation speed range near the low rotation speed range or an idling rotation speed range. Thus, in the low rotation speed range of the engine 82, the oil control valve 6 is controlled to be fully closed.

Due to the oil control valve 6, oil is not supplied to the second valve passage portion 22. In the low rotation speed range of the engine 82, the hydraulic pressure is applied to the front end surface only of the first valve portion 41 in the first valve passage portion 21 through the first branch passage 71, and the hydraulic pressure is not applied to the second valve portion 42 in the second valve passage portion 22.

Figure 3A:
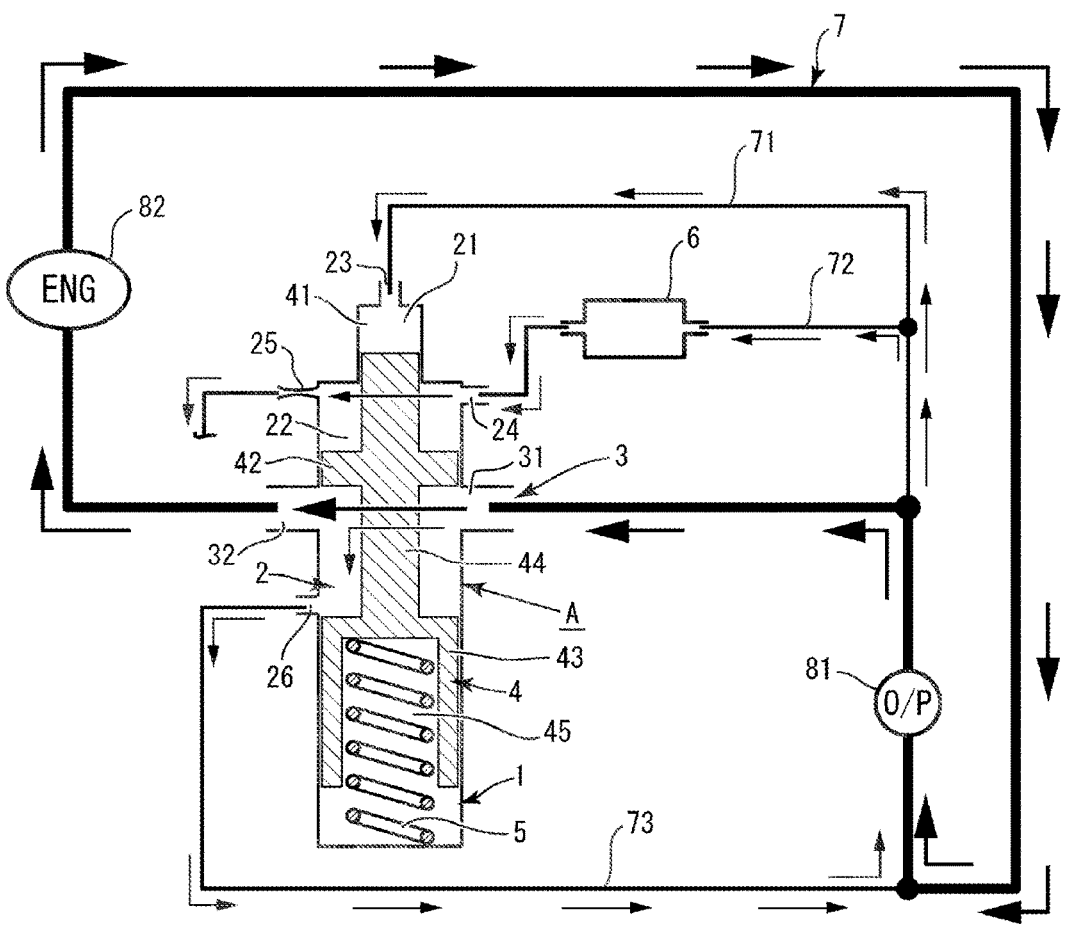
FIG. 3A is a schematic diagram illustrating the flow of oil, in a medium rotation speed range, in the relief valve device according to the present invention
Figure 3B:
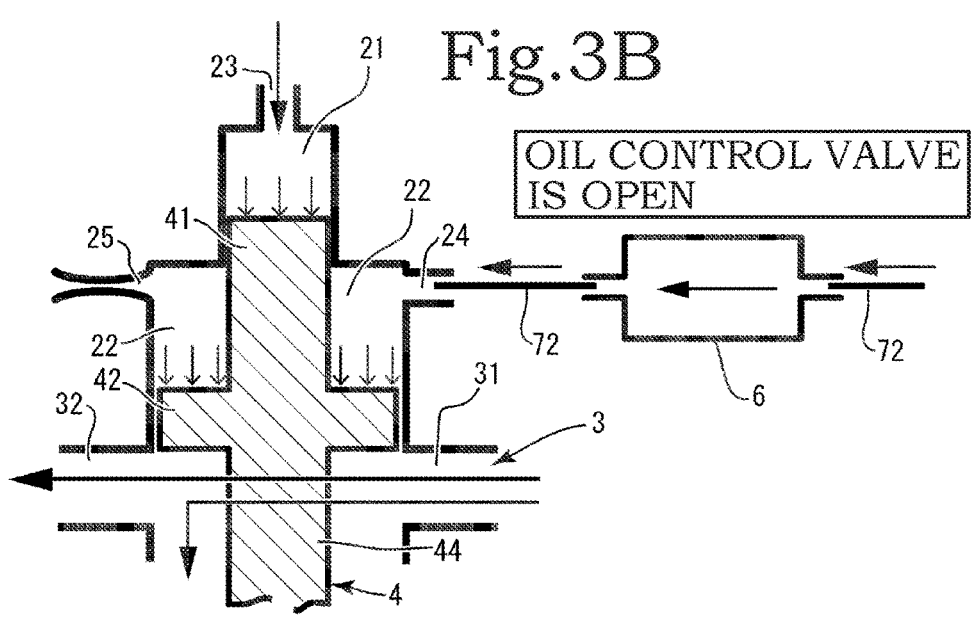
FIG. 3B is a longitudinal schematic side diagram illustrating the first valve passage portion, the second valve passage portion, and the oil control valve.
Figure 4A:
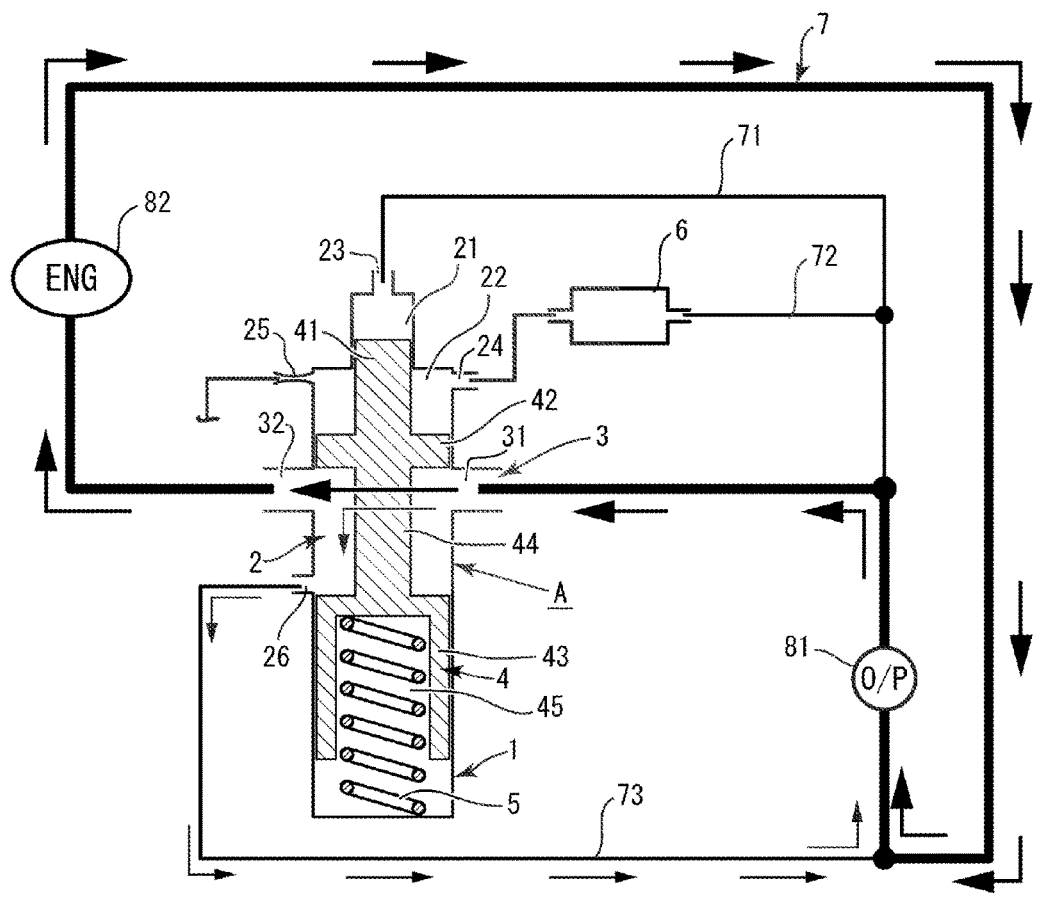
FIG. 4A is a schematic diagram illustrating the flow of oil, in a high rotation speed range, in the relief valve device according to the present invention
Figure 4B:
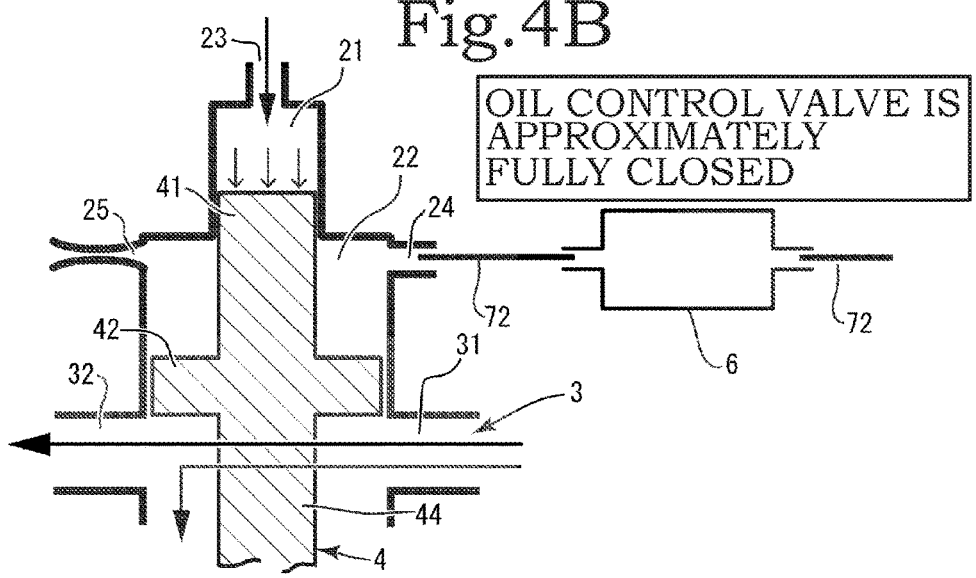
FIG. 4B is a longitudinal schematic side diagram illustrating the first valve passage portion, the second valve passage portion, and the oil control valve.
Figure 8:
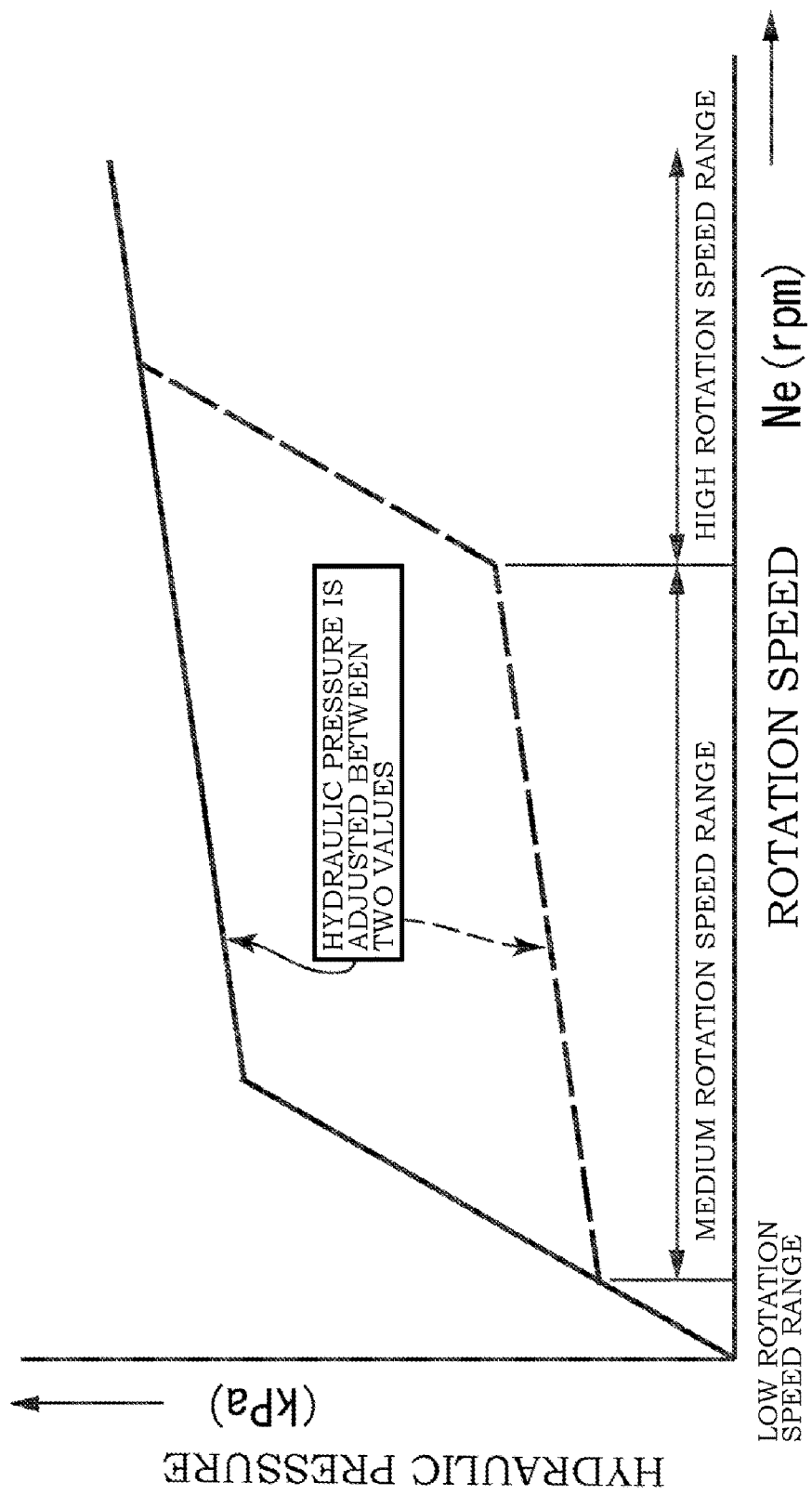
FIG. 8 is a graph illustrating the characteristics of the conventional technique.

Subsequently, as illustrated in FIGS. 3A and 3B, in the medium rotation speed range of the engine 82, the oil control valve 6 operates to supply oil into the second valve passage portion 22. In the medium rotation speed range, the hydraulic pressure is rarely changed in a rotation speed range from the starting portion (the portion near the low rotation speed range) to the ending portion (the portion near the high rotation speed range). When the rotation speed of the engine 82 increases within the medium rotation speed range, the oil control valve 6 gradually increases the opening area of the throttle valve.

In this way, the oil control valve 6 performs control so that the amount of oil flowing through the second branch passage 72 increases. Since the rotation speed of the oil pump 81 also increases as the rotation speed of the engine 82 increases, the hydraulic pressure of the oil discharged from the oil pump 81 increases so that oil is supplied from the first branch passage 71 into the first valve passage portion 21 and the first valve portion 41 receives the hydraulic pressure.

At the same time, the oil control valve 6 supplies oil from the second branch passage 72 into the second valve passage portion 22 to assist movement of the valve body 4. With the oil control valve 6 assisting the movement of the valve body 4, the valve body 4 opens the relief discharge port 26 to perform a relief operation.

As described above, in the medium rotation speed range, since the oil control valve 6 operates to supply an appropriate amount of oil into the second valve passage portion 22 steplessly according to a rotation speed. In this way, it is possible to maintain the relief hydraulic pressure to an approximately constant value without changing the relief hydraulic pressure greatly. Thus, it is possible to avoid an unnecessary relief operation in the medium rotation speed range.

When the rotation speed within the medium rotation speed range approaches the high rotation speed range, the oil control valve 6 gradually narrows the opening area to decrease the hydraulic pressure on the second valve passage portion 22, and the hydraulic pressure is gradually applied to the first valve portion 41 only close to the first valve passage portion 21. Thus, it is possible to change the hydraulic pressure smoothly from the medium rotation speed range to the high rotation speed range.

Subsequently, the oil control valve 6 is approximately fully closed, the supply of oil toward the second valve passage portion 22 stops, the hydraulic pressure is supplied to the first valve passage portion 21 only, and the first valve portion 41 only receives the hydraulic pressure. In the high rotation speed range, since the hydraulic pressure is high, the valve body 4 moves freely to open the relief discharge port 26, and a relief operation is performed.

As described above, the relief valve device of the present invention has a configuration in which the first valve portion 41 is disposed in the first valve passage portion 21, the second valve portion 42 is disposed in the second valve passage portion 22, oil is supplied to the second valve passage portion 22 through the oil control valve 6 while the amount of oil is increased and decreased steplessly, and the supplied oil is discharged from the orifice 25.

Moreover, since the oil control valve 6 that supplies oil while changing the amount of oil steplessly is provided in the relief valve A, it is possible to supply oil to the second valve passage portion 22 while adjusting the amount of oil steplessly. In this way, in the medium rotation speed range in which a relief operation is selectively required depending on the rotation speed range of the engine 82, oil can be supplied from the oil control valve 6 to the second valve passage portion 22 while changing the amount of oil steplessly.

In the second valve passage portion 22, the amount of supplied oil can be set always appropriately according to a change in the rotation speed in the medium rotation speed range of the engine 82, an engine load, or the like. By supplying oil into the second valve passage portion 22 according to a change in the rotation speed, an engine load, or the like, the operation based on the hydraulic pressure, of the second valve portion 42 in the second valve passage portion 22 during a relief operation assists the operation of the valve body 4 according to a change in the hydraulic pressure of the oil flowing into the first valve passage portion 21. Thus, it is possible to realize a relief operation with a desired hydraulic pressure in the medium rotation speed range (see FIGS. 6 and 7).

Figure 9A:
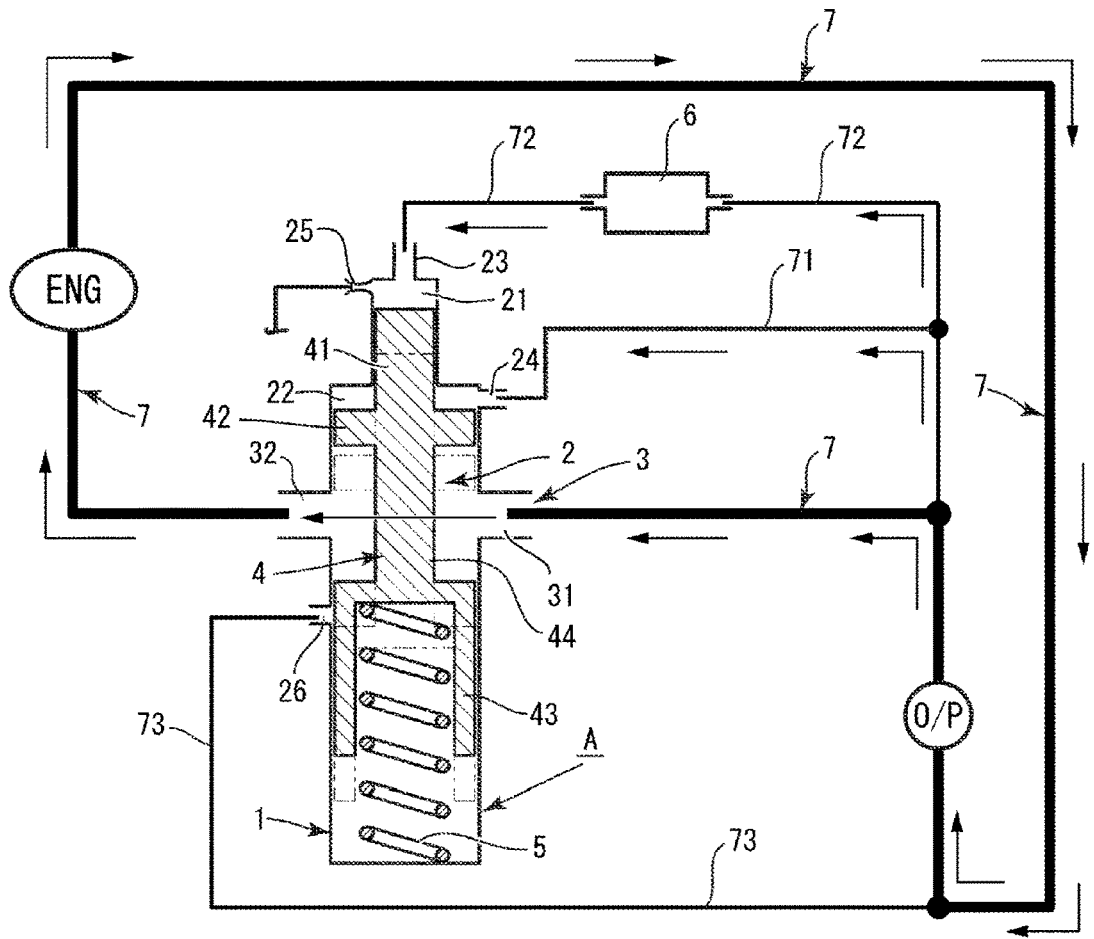
FIG. 9A is a schematic diagram illustrating a state in which a relief valve device according to a second embodiment of the present invention is incorporated into an oil circulation circuit and FIG. 9B is a schematic diagram of a housing according to the second embodiment.
Figure 9B:
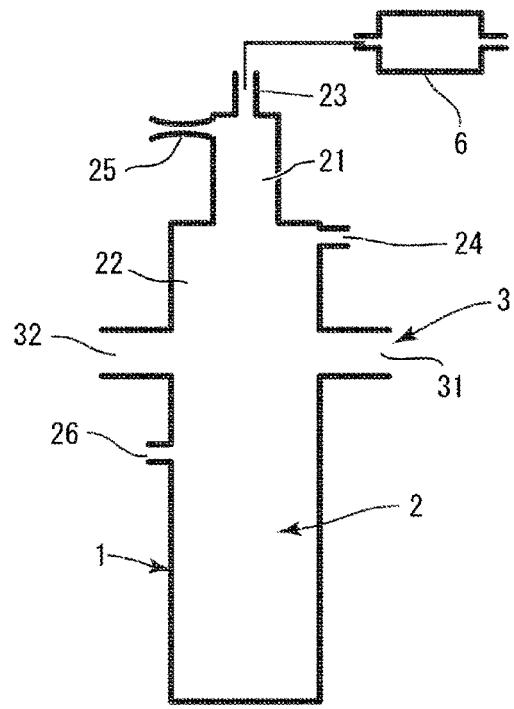

Next, a second embodiment of the present invention will be described. As illustrated in FIGS. 9A and 9B, a configuration of the second embodiment is approximately the same as the configuration of the first embodiment. The valve chamber 2 includes the first valve passage portion 21 and the second valve passage portion 22, and the valve body 4 includes the first valve portion 41 and the second valve portion 42. The first inlet port 23 which is an inlet port of oil having passed through the oil control valve 6 and the orifice 25 are formed in the first valve passage portion 21.

In the second embodiment, in a state in which the second valve portion 42 of the valve body 4 has reached the front end portion of the second valve passage portion 22, the front end of the first valve portion 41 does not make contact with the front end portion of the first valve passage portion 21, and a gap is formed therebetween. Due to the gap, the orifice 25 and the first inlet port 23 always communicate with each other inside the first valve passage portion 21. Moreover, the relief oil supplied from the oil control valve 6 can pass from the first inlet port 25 through the first valve passage portion 21 of the valve chamber 2 and flow into the orifice 25.

In the second embodiment, similarly to the first embodiment, the relief oil flowing from the first and second inlet ports 23 and 24 into the first and second valve passage portions 21 and 22 of the valve chamber 2 applies hydraulic force in a direction in which the valve body 4 moves toward the rear end side of the valve chamber 2. That is, the relief operation of the second embodiment is the same as the first embodiment.

Figure 10A:
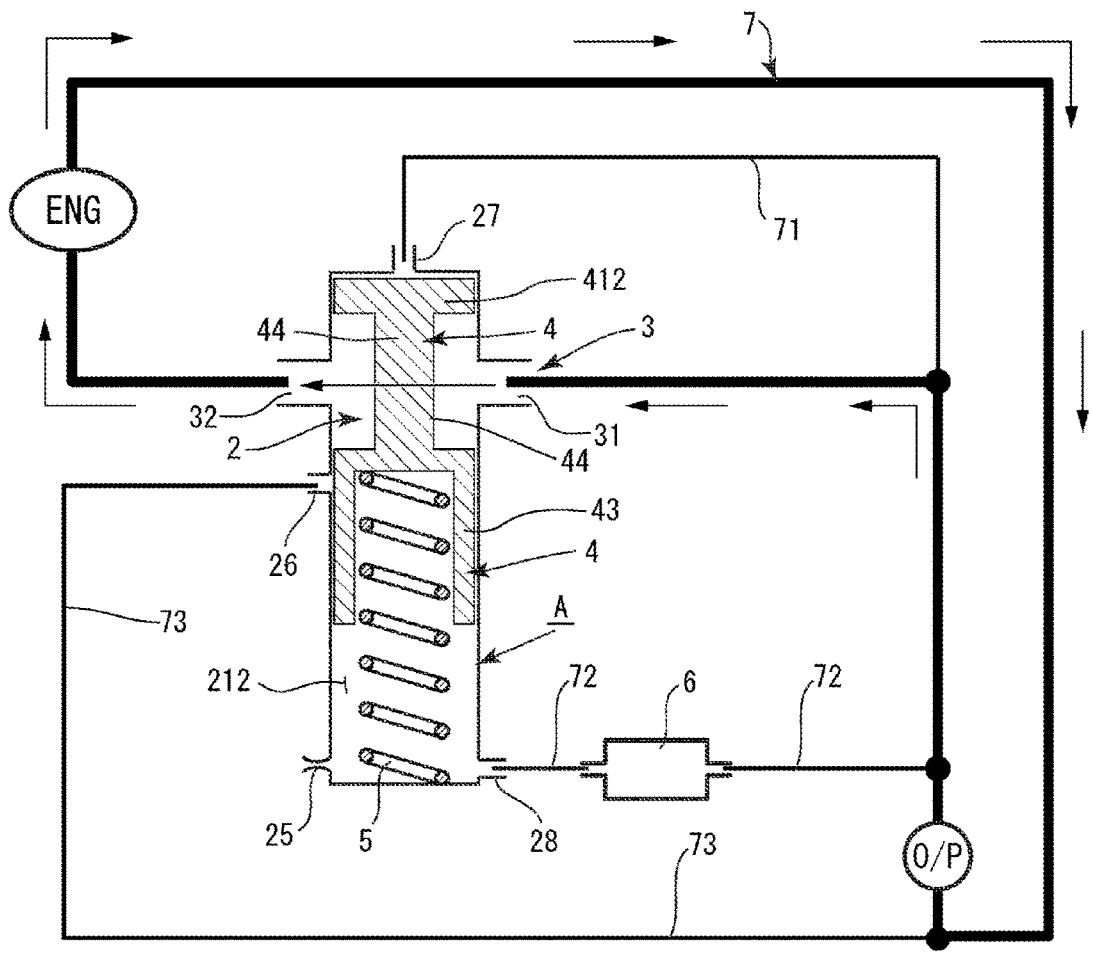
FIG. 10A is a schematic diagram illustrating a state in which a relief valve device according to a third embodiment of the present invention is incorporated into an oil circulation circuit and FIG. 10B is a schematic diagram of a housing according to the third embodiment.
Figure 10B:
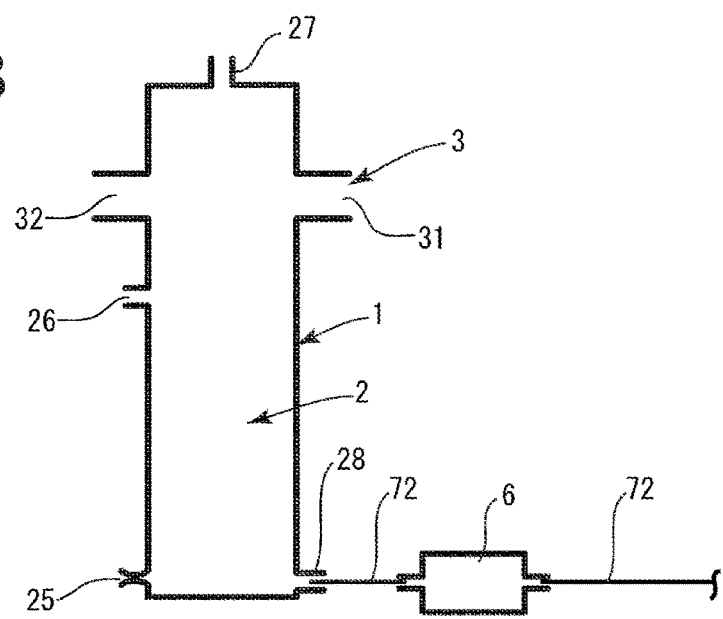

Next, a third embodiment of the present invention will be described. As illustrated in FIGS. 10 and 10B, the third embodiment has a configuration in which the valve chamber 2 of the includes the first and second valve passage portions 21 and 22 which have the same inner diameter and have an approximately integrated cylindrical shape. This unified passage will be referred to as an integrated passage portion 212. That is, the valve chamber 2 is configured as the integrated passage portion 212. An oil inlet port is formed in a front end portion of the valve chamber 2 (that is, the integrated passage portion 212).

The front-end-side inlet port will be referred to as a first integrated inlet port 27. The first integrated inlet port 27 communicates with the first branch passage 71 that branches from the oil circulation circuit 7. That is, the first integrated inlet port 27 does not communicate with the oil control valve 6. Moreover, the orifice 25 and a second integrated inlet port 28 as an inlet port for the oil supplied from the oil control valve 6 are formed in the rear end portion of the integrated passage portion 212 of the valve chamber 2.

Moreover, the valve body 4 has such a configuration that the first and second valve portions 41 and 42 are integrated as one disc. A valve portion having such a disc shape obtained by integrating the first and second valve portions 41 and 42 will be referred to as a front end valve portion 412. In the third embodiment, the valve body 4 including the front end valve portion 412, the connecting shaft portion 44, and the third valve portion 43 moves inside the integrated passage portion 212. The third valve portion 43 has the same configuration as the first embodiment, and the elastic member 5 is inserted and housed therein. The front end valve portion 412 and the third valve portion 43 have the same diameter.

The orifice 25 and the second integrated inlet port 28 for the oil supplied from the oil control valve 6 are formed on the rear end side of the valve chamber 2. That is, the orifice 25 and the second integrated inlet port 28 for the oil supplied from the oil control valve 6 are positioned on the side of the valve chamber 2 on which the third valve portion 43 of the valve body 4 is disposed. In the third embodiment, the pressure of oil in the integrated passage portion 212 on the upstream side of the formation position of the orifice 25 increases as the amount and the velocity of oil supplied from the oil control valve 6 increase. Thus, even when the hydraulic force based on the oil on the side of the first integrated inlet port 27 is applied to the valve body 4, the movement of the valve body 4 is controlled to be slowed by the resistance based on the hydraulic pressure of the oil on the side of the second integrated inlet port 28.

The movement is controlled by the oil control valve 6 controlling the amount of supplied oil. The rear end of the third valve portion 43 does not make contact with the rear end of the integrated passage portion 212 and a gap is formed therebetween. Due to the gap, the orifice 25 and the second integrated inlet port 28 always communicate with each other. Moreover, oil having passed through the oil control valve 6 can pass from the second integrated inlet port 28 through the integrated passage portion 212 and flow into the orifice 25.

Figure 11A:
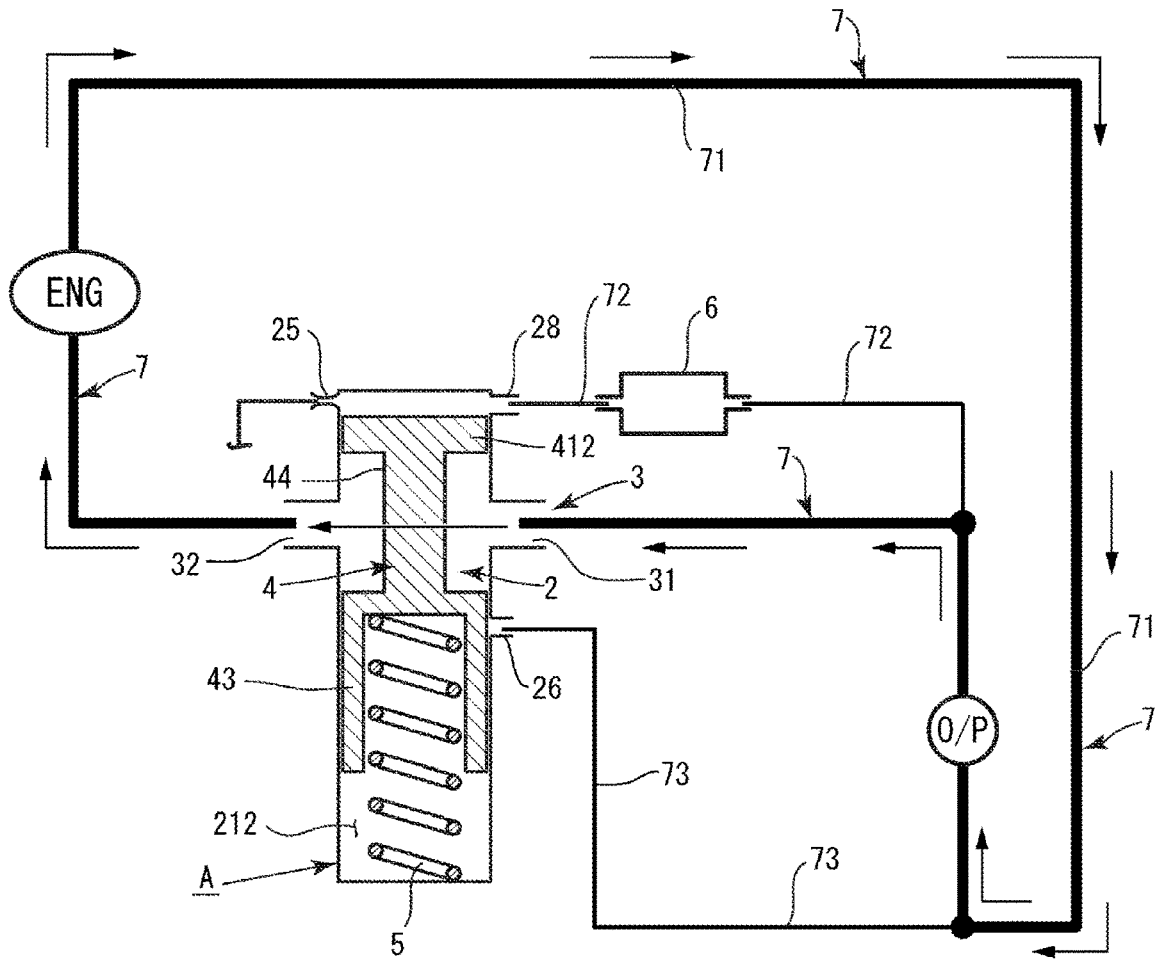
FIG. 11A is a schematic diagram illustrating a state in which a relief valve device according to a fourth embodiment of the present invention is incorporated into an oil circulation circuit and FIG. 11B is a schematic diagram of a housing according to the fourth embodiment.
Figure 11B:
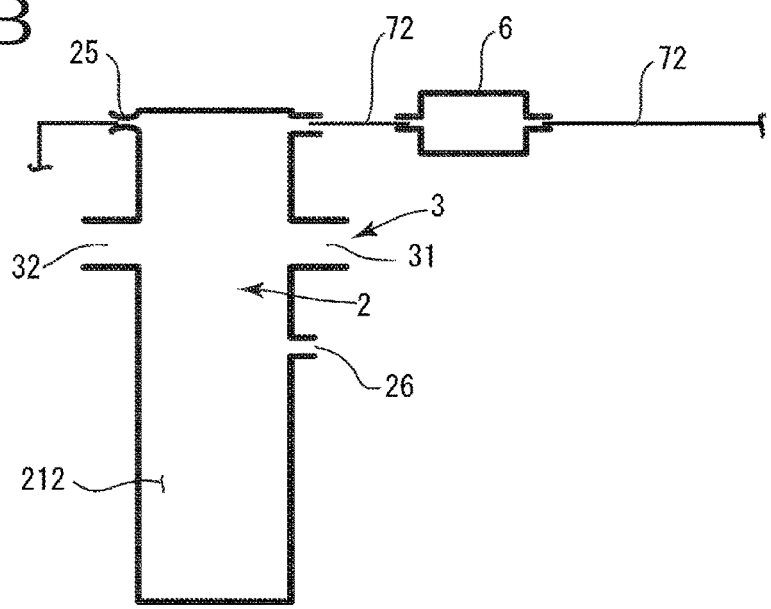

Next, a fourth embodiment of the present invention will be described. As illustrated in FIGS. 11A and 11B, the fourth embodiment has a configuration in which the valve chamber 2 of the third embodiment is configured as the integrated passage portion 212 and includes the second integrated inlet port 28 that communicates with the oil control valve 6 in addition to the relief discharge port 26, the inlet hole 31, and the outlet hole 32. Moreover, the valve body 4 includes the front end valve portion 412, the connecting shaft portion 44, and the third valve portion 43. This embodiment has the simplest configuration among the embodiments of the present invention and In the second embodiment, the first valve portion is disposed in the first valve passage portion, the second valve portion is disposed in the second valve passage portion, oil is supplied to the second valve passage portion through the oil control valve while the amount of supplied oil is increased and decreased steplessly, and the supplied oil is discharged from the orifice. In this way, since the oil control valve that supplies oil while changing the amount of oil steplessly is provided in the relief valve, it is possible to supply oil into oil flowing into the second valve passage portion. As a result, in the medium rotation speed range in which a relief operation is selectively required depending on the rotation speed range of the engine, oil can be supplied from the oil control valve to the second valve passage portion while changing the amount of supplied oil steplessly.

In the second valve passage portion, the amount of supplied oil can be set always appropriately according to a change in the rotation speed within the medium rotation speed range of the engine, an engine load, or the like. By supplying oil into the second valve passage portion according to a charge in the rotation speed, an engine load, or the like, the operation based on the hydraulic pressure, of the second valve portion in the second valve passage portion during a relief operation assists the operation of the valve body according to a change in the hydraulic pressure of the oil flowing into the first valve passage portion. Thus, it is possible to realize a relief operation with a desired hydraulic pressure in the medium rotation speed range.

Specifically, only a small amount of oil is discharged from the orifice. Thus, the larger the amount of oil supplied from the oil control valve into the valve chamber, the higher the hydraulic pressure of the second valve passage portion. Conversely, the smaller the amount of oil supplied from the oil control valve, the lower the hydraulic pressure of the second valve passage portion. Thus, due to the orifice, the hydraulic pressure of oil supplied from the oil control valve into the valve chamber is maintained appropriately, and the above-described operation is realized.

In the third embodiment, although the valve chamber includes the first valve passage portion having the orifice and the second valve passage portion, and the position of the orifice is different from that of the second embodiment, the valve body can perform approximately the same operation as the second embodiment and can perform a satisfactory relief operation. In the fourth embodiment, the oil control valve is disposed on the rear end side and the upstream side of the valve chamber so as to supply oil while increasing and decreasing the amount of oil steplessly, and to discharge the supplied oil from the orifice. Due to such a configuration, even when the oil control valve fails, the relief pressure does not decrease and the reliability of the engine can be secured.

In the fifth and sixth embodiments, since a solenoid valve is used as the oil control valve, it is possible to decrease the number of components and to decrease an installation space. In the seventh and eighth embodiments, the smallest cross-sectional area of a passage to the valve chamber in the fully open state of the oil control valve is larger than the smallest cross-sectional area of the orifice.

Since the orifice is smaller in cross-sectional area, the hydraulic pressure of the valve chamber in the fully open state of the oil control valve is controlled based on the cross-sectional area of the orifice only. Therefore, it only requires to form the cross-sectional area of the orifice accurately. In the ninth and tenth embodiments, since the oil control valve is fully closed in a rotation speed range near a low rotation speed range and an idling rotation speed range of the engine, it is possible to prevent an unnecessary relief operation in the low rotation speed range.

In the eleventh and twelfth embodiments, when the rotation speed increases within the medium rotation speed range of the engine, the oil control valve supplies oil into the valve chamber while continuously increasing the amount of supplied oil steplessly. In this way, it is possible to maintain the hydraulic pressure to an approximately constant value without changing the hydraulic pressure greatly in the medium rotation speed range. In the thirteenth and fourteenth embodiments, since the amount of oil supplied into the valve chamber in the high rotation speed range of the engine is decreased steplessly, the hydraulic pressure in the high rotation speed range of the engine can be increased steplessly.

What is claimed is:

1. A relieve valve device, comprising:
   a housing including a valve chamber, an orifice, and a relief discharge port;
   a valve body that opens and closes the relief discharge port while moving inside the valve chamber of the housing;
   a relief valve including an elastic member that elastically biases the valve body in a direction in which the valve body closes the relief discharge port; and
   an oil control valve that controls a supply of oil into the valve chamber, wherein an inlet port for the oil supplied from the oil control valve and the orifice are configured such that the oil can always circulate in the valve chamber,
   wherein the valve chamber includes a first valve passage portion including the orifice, and a second valve passage portion,
   wherein the valve body includes a first valve portion, a second valve portion, and a third valve portion arranged in an axial direction,
   wherein the oil control valve supplies the oil to the first valve passage portion,
   wherein the first valve portion is disposed in the first valve passage portion,
   wherein the second valve portion is disposed in the second valve passage portion,
   wherein the third valve portion is disposed in the valve chamber,
   wherein the oil is supplied to the first valve passage portion through the oil control valve while an amount of the oil is increased and decreased steplessly, and the supplied oil is discharged from the orifice,
   wherein a diameter of the first valve portion is smaller than a diameter of the second valve portion, and the second valve portion and the third valve portion are connected in a state of being separated by a connecting shaft portion with a predetermined interval interposed therebetween,
   wherein, in a state in which the second valve portion has reached a front tend portion of the second valve passage portion, the first valve portion does not make contact with a front end portion of the first valve passage portion, and
   wherein an inlet hole and an outlet hole of a main passage are formed in an inner circumferential wall of the valve chamber, the relief discharge port is disposed at a position on an opposite side of the first valve passage portion and the second valve passage portion about the main passage, and the third valve portion of the valve body is configured for opening and closing the relief discharge port.

2. The relief valve device according to claim 1, wherein a solenoid valve is used as the oil control valve.

3. The relief valve device according to claim 1, wherein a smallest cross-sectional area of a passage to the valve chamber in a fully open state of the oil control valve is larger than a smallest cross-sectional area of the orifice.

4. The relief valve device according to claim 1, wherein the oil control valve is fully closed in a rotation speed range near a low rotation speed range and an idling rotation speed range of an engine.

5. The relief valve device according to claim 1, wherein, when a rotation speed increases within a medium rotation speed range of an engine, the oil control valve increases an amount of the oil supplied to the valve chamber steplessly.

6. The relief valve device according to claim 1, wherein, when a rotation speed increases within a high rotation speed range of an engine, the oil control valve decreases an amount of the oil supplied to the valve chamber steplessly.

7. The relief valve device according to claim 1, wherein the orifice extends from a side surface of the first valve passage portion.

8. The relief valve device according to claim 1, wherein the orifice is disposed on a surface of the first valve passage portion.

9. The relief valve device according to claim 1, wherein an inlet of the orifice defines an outlet of the first valve passage portion.

10. The relief valve device according to claim 1, wherein the orifice and the first valve passage portion are located between the first valve portion and the oil control valve.

11. The relief valve device according to claim 1, wherein the orifice and the inlet port, which includes an inlet of the oil passed through the oil control valve, are located in the first valve passage portion.

12. The relief valve device according to claim 1, wherein, in said state, a front end of the first valve portion is spaced apart from the front end portion of the first valve passage portion, such that a gap is formed between the front end of the first valve portion and the front end portion of the first valve passage portion.

13. The relief valve device according to claim 12, wherein the gap provides an area such that the orifice and the inlet port communicate with each other inside the first valve passage portion.

14. The relief valve device according to claim 12, wherein the gap provides an area such that the orifice always communicates with the inlet port.

15. The relief valve device according to claim 1, wherein the oil supplied from the oil control valve passes from the inlet port through the first valve passage portion of the valve chamber and flows into the orifice.

16. The relief valve device according to claim 1, wherein the third valve portion of the valve body opens and closes the relief discharge port as the valve body moves along the axial direction.

17. The relief valve device according to claim 1, wherein, in the valve chamber, the elastic member is disposed between opposing sides of the third valve portion.

18. The relief valve device according to claim 1, wherein, in a state that the third valve portion closes the relief discharge port, in a radial direction of the valve body, the third valve portion is disposed between the elastic member and the relief discharge port.

19. The relief valve device according to claim 1, wherein, in a radial direction of the valve body, the connecting shaft portion is located between the inlet hole and the outlet hole of the main passage.

20. The relief valve device according to claim 1, wherein, in the axial direction, the main passage is disposed between the relief discharge port and the second valve passage portion.

* * * * *